(12) United States Patent
Lenehan

(10) Patent No.: US 6,667,622 B1
(45) Date of Patent: Dec. 23, 2003

(54) VEHICLE ENGINE PULSE STREAM ANALYZER

(76) Inventor: Peter J. Lenehan, 22721 La Quinta Dr., Mission Viejo, CA (US) 92691

( * ) Notice: Subject to any disclaimer, the term of this patent is extended or adjusted under 35 U.S.C. 154(b) by 97 days.

(21) Appl. No.: 09/847,928

(22) Filed: May 3, 2001

Related U.S. Application Data
(60) Provisional application No. 60/253,498, filed on Nov. 28, 2000, and provisional application No. 60/201,698, filed on May 3, 2000.

(51) Int. Cl.[7] .......................... F02P 17/00; G01M 15/00; G06F 7/00
(52) U.S. Cl. ........................ 324/384; 324/402; 324/382; 73/119 A; 701/29
(58) Field of Search ................................ 324/378, 380, 324/381, 382, 384, 388, 391, 392, 402, 379, 115; 701/29, 101, 103, 102, 33, 99; 73/117.3, 119 A; 123/294, 296, 305, 478; 345/440.2, 10; 340/660

(56) References Cited

U.S. PATENT DOCUMENTS

| | | | |
|---|---|---|---|
| 3,745,768 A | 7/1973 | Zechnall et al. | 60/276 |
| 3,938,075 A | 2/1976 | Reddy | 340/52 |
| 3,948,228 A | 4/1976 | Luchaco | 123/32 |
| 4,149,408 A | 4/1979 | Ezoe et al. | 73/118 |
| 4,714,998 A * | 12/1987 | Bussey et al. | 701/99 |
| 4,800,378 A * | 1/1989 | Putrow et al. | 324/379 |
| 4,831,560 A | 5/1989 | Zaleski | 364/551.01 |
| 4,851,833 A * | 7/1989 | Putrow et al. | 324/379 |
| 4,878,380 A | 11/1989 | Goodman | 73/118.1 |
| 5,001,432 A | 3/1991 | Wixon | 324/402 |
| 5,027,646 A | 7/1991 | Mizutani et al. | 73/118.1 |
| 5,387,870 A * | 2/1995 | Knapp et al. | 324/379 |
| 6,135,101 A | 10/2000 | Konno et al. | 123/689 |

* cited by examiner

*Primary Examiner*—Jay Patidar
*Assistant Examiner*—Donald M. Lair
(74) *Attorney, Agent, or Firm*—Sheldon & Mak

(57) ABSTRACT

A low cost, easy to use, hand held pulse stream analyzer is designed to show, after an engine stops operating, which pulse stream, ignition or injection, quit first. Additionally, the analyzer is capable, using relative time domain analysis to comparatively analyze these pulse streams to the alternator ripple pulse stream, of determining if the fuel flow to the injectors quit, thus causing the engine to quit. This information quickly gives the technician a direction to investigate to find a responsible faulty component for the problem being experienced, and is especially helpful in attempting to diagnose intermittent faults in a much more efficient manner. The inventive device is usable on virtually all brands and types of gasoline powered vehicles.

8 Claims, 3 Drawing Sheets

VEHICLE ENGINE PULSE STREAM ANALYZER

This application claims the benefit under 35 U.S.C. 119(e) of U.S. Provisional Application Serial No. 60/201,698, filed on May 3, 2000, and U.S. Provisional Application Serial No. 60/253,498, filed on Nov. 28, 2000, both of which are herein expressly incorporated by reference.

BACKGROUND OF THE INVENTION

This invention relates generally to diagnostic equipment for vehicle engines, and more particularly to portable and convenient analyzing equipment for evaluating engine pulse streams in order to diagnose the cause of an engine problem.

The modern vehicle engine, operating under electronic on-board computer control, utilizes many pulse streams coming from various sensors to the computer, and also utilizes many outputs from the computer to various engine controls, such as those controlling ignition and injection. The continuous pulse streams are required to keep the engine running, and the failure of any one of these pulse streams, or lack of fuel to the engine, will cause the engine to stop, whereupon all pulse streams will stop.

There is no equipment of which Applicant is aware, presently on the market, which can automatically analyze or compare pulse streams to identify what caused an engine to quit. Technicians may try to use serial data recordings from expensive scanners, such as that disclosed in U.S. Pat. No. 4,831,560. However, these types of scanners have update times far slower than the time it takes for the engine to stop, so they give relatively useless data for making this type of analysis. Such an analysis may be possible using very expensive 4-channel digital storage oscilloscopes (DSO), but would require a highly trained technician to operate the equipment, as well as the availability of a costly DSO. Even so, when an engine stops because of the failure of fuel or pulse streams, a technician may be watching it, yet still not know why it stopped, as the event occurs sometimes in less than 100 mS, and all pulse streams stop, as well, after the engine stops. These types of faults, especially intermittent faults, are the hardest to solve, and often, the time expended attempting to diagnose the fault greatly exceeds the amount which can be billed to the customer.

What is needed, therefore, is a low cost, portable device which is capable of automatically analyzing the various pulse streams, and to identify, before they all stop, which pulse stream stopped first, thus causing the engine to stop.

SUMMARY OF THE INVENTION

The present invention solves the foregoing problems by providing a low cost, easy to use, hand held pulse stream analyzer which is designed to show, after an engine stops operating, which pulse stream, ignition or injection, quit first. Additionally, the inventive system is capable, using relative time domain analysis to comparatively analyze these pulse streams to the alternator ripple pulse stream, of determining if the fuel flow to the injectors quit, thus causing the engine to quit. This information quickly gives the technician a direction to investigate to find a responsible faulty component for the problem being experienced, and is especially helpful in attempting to diagnose intermittent faults in a much more efficient manner. The inventive device is usable on virtually all brands and types of gasoline powered vehicles.

To operate the system, two alligator clips, one positive and one negative, are connected to the vehicle's battery, from whence the analyzer is powered, and the pulse stream of the alternator ripple is detected. The ignition pulse stream is picked up by an inductive or capacitive pickup placed near the coil (coil on plug) or around a spark plug wire. The injector pulse stream is picked up by an inductive pickup attached inline with a port injector or throttle body injector so that the magnetic field of the injector coil is detected. All pulse streams are amplified if necessary, and then delayed equally in the electronics to produce steady (DC) levels indicating their presence. The alternator ripple pulse stream is the reference as to when the engine stops turning, since the feedback in the regulator, maintaining the rotor current, is independent of the ignition after starting. There is also included a "Cut" function to halve the alternator ripple amplifier gain, in order to cut interference from electric fans or the like which might cause inaccuracy in analyzing a fuel quit result. The test for interference consists of turning on the ignition without starting the engine, and checking to see if the "Alternator" indicator is illuminated. If so, it is preferable to turn off all fans, or if not possible, use the "Cut" function and check to see if the "Alternator" indicator goes out. If the ignition quits first, this is detected and latched, so that an indicator light labeled "Ignition Quit" is lit. This ends the test, and nothing further will affect the result. If, on the other hand, the fuel injection quits first, this is detected and latched, so that an indicator light labeled "Injection Quit" is lit. Again, this ends the test, and nothing further will affect the result. If the fuel quits (prior to reaching the injectors), then both the ignition and injection pulse streams will continue until the engine stops, producing a very short time interval between their time of stoppage and the time of stoppage of the alternator ripple.

Since different vehicles will have unique times between when ignition stops and alternator ripple stops, a set-up operation when starting the test captures this unique time and uses 75% of this time to identify whether lack of fuel flow caused the engine to quit. If the difference in time between the ignition or injection pulse streams and the alternator ripple stoppages is less than this 75% time, then a result of "Fuel Quit" will be set.

A setup operation is achieved by running the engine in "Setup" mode, and turning off the ignition switch. The result is that the analyzer device captures the unique time for that engine, storing it in memory, and automatically presenting 75% of this time as a "fuel quit" window. By using 75% of the time, if the ignition or injection fails, or is turned off again, then "Ignition Quit" or "Injection Quit" results will be obtained and displayed.

Other advantages of the present invention are that the analyzer may be used while driving to analyze stalling as well as at idle. If an engine is turning over, but not starting, the analyzer will show if ignition and injection pulse streams are present, indicating a possible fuel problem. The inductive pickup can be used to confirm quickly that pulses are driving each injector and that it is not an open circuit. The pulse stream analysis described can also be achieved using ASICS (Application Specific Integrated Circuits), PLDS (Programmable Logic Devices), or embedded microprocessors and software or firmware. This technology can also be applied to capture many other critical pulse stream or level failures on computer controlled engines, to aid in identifying more accurately faulty components such as crank sensors, relays, or fuel pumps, which could cause the engine to quit.

More particularly, there is provided a pulse stream analyzer for use in diagnosing the cause of vehicle engine failure. This pulse stream analyzer comprises, in a preferred embodiment, a housing having a keypad, which keypad has a plurality of keys and indicator lights disposed thereon, and a first circuit portion for processing a ripple signal from an alternator of the vehicle to provide a digital pulse stream representing the ripple signal, which provides an indication as to whether the engine is operating. Further elements of the analyzer include a second circuit portion having a capacitive ignition pickup for providing an ignition digital pulse stream, and a third circuit portion having a magnetic injector pickup for providing an injector digital pulse stream. These three digital pulse streams each have an equal delay applied to produce DC logic signals to the gates. The analyzer circuitry further comprises a first four input AND gate for receiving the ignition logic signal and a second four input AND gate for receiving the injection logic signal. A latching element is also provided, such that whichever of the digital ignition and digital injection pulse streams stops first, while the vehicle engine is operating, a high output will be produced at its corresponding gate, causing the other gate to be locked out by the latching element, which in turn causes an indicator related to the digital pulse stream which stopped first to be activated.

In another aspect of the invention, there is disclosed a method for diagnosing the cause of a vehicle engine failure. The inventive method comprises a step of connecting a digital pulse stream analyzer to an alternator of a vehicle engine to be tested. A capacitive ignition pickup of the digital pulse stream analyzer is connected to a spark plug or coil wire of the engine, and a magnetic pickup is placed in close proximity to an injector body or throttle body of a fuel injector of the engine. An ignition switch of the vehicle is turned on without starting the vehicle engine, and checks are made to ensure that there is no electrical interference with the analyzer. Then, the vehicle engine is started and a setup sequence is initiated to set a unique delay time interval for the vehicle. Following this, the vehicle engine is turned off, to set the aforementioned unique delay time interval. The vehicle engine is then started again, and a reset circuit is activated, which initiates the test sequence. A test result indication is evaluated on a keyboard of the analyzer, and the test is repeated as often as desired to ensure a consistent and accurate result.

The invention, together with additional features and advantages thereof, may best be understood by reference to the following description taken in conjunction with the accompanying illustrative drawing.

DESCRIPTION OF THE PREFERRED EMBODIMENT

Figure 1:
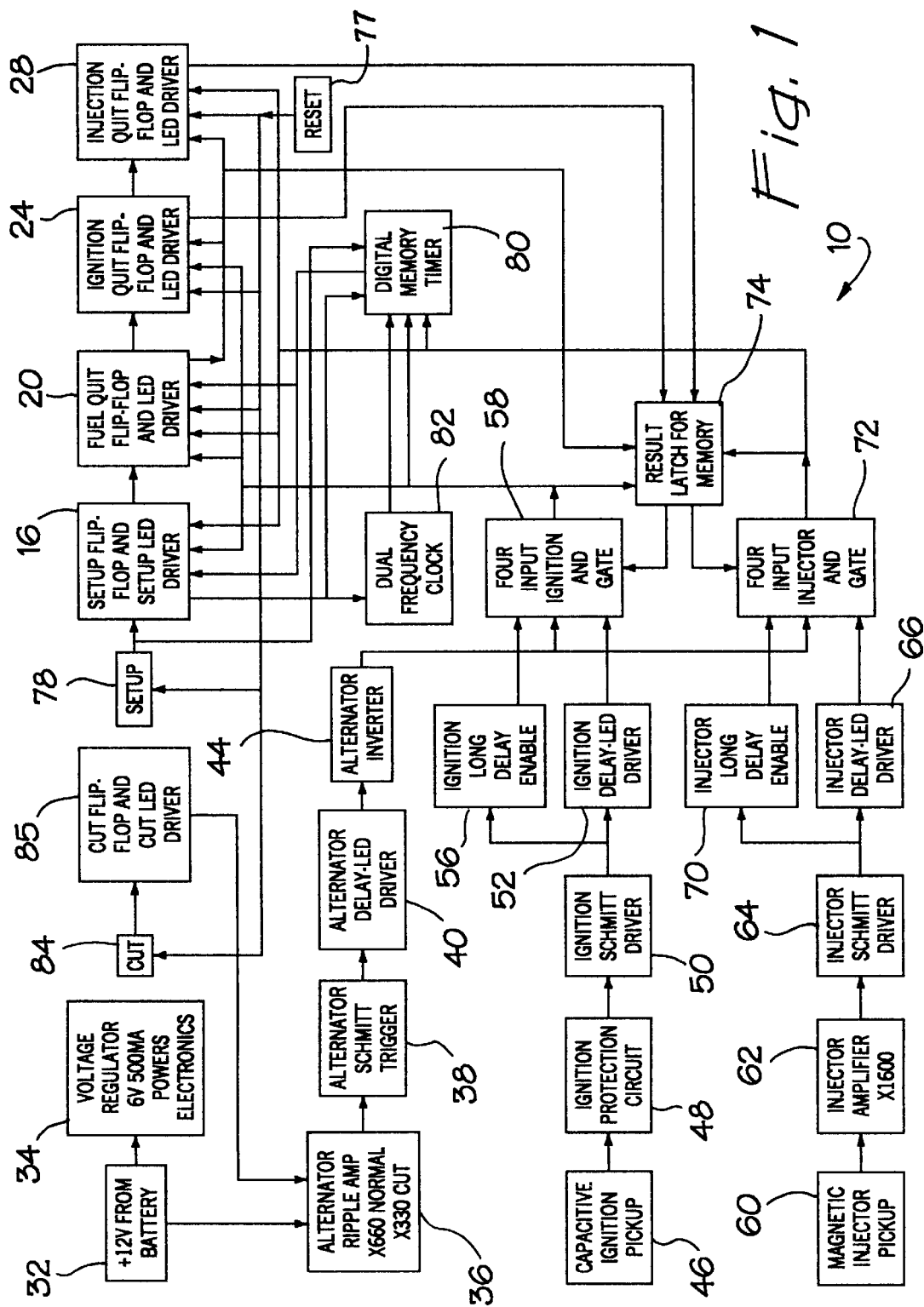
FIG. 1 is a block diagram showing the operation of an engine pulse stream analyzer constructed in accordance with the principles of the present invention.
Figure 3:
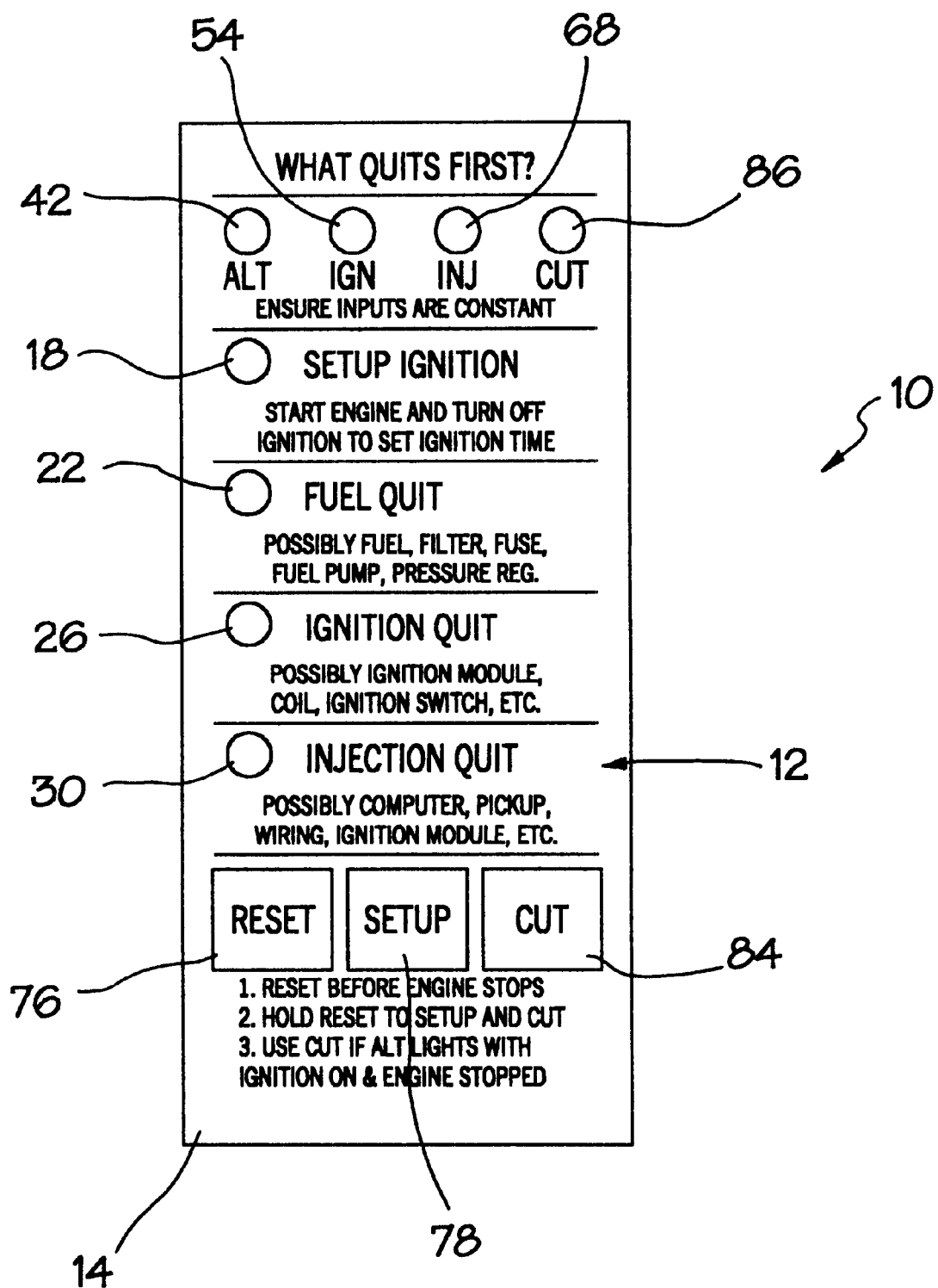
FIG. 3 is a diagram of a membrane keypad for the engine pulse stream analyzer of the present invention, with Light Emitting Diode (LED) ports for displaying inputs and results.

Referring now more particularly to the drawings, there is shown in FIGS. 1 and 3 an engine pulse stream analyzer 10, which comprises a housing 12 having a keypad 14. The analyzer 10 comprises a setup flip-flop and LED driver 16 (FIG. 1) for driving an LED 18 (FIG. 3) labeled "SETUP IGNITION". A fuel quit flip-flop and LED driver 20 (FIG. 1) drives an LED 22 labeled "FUEL QUIT". An ignition quit flip-flop and LED driver 24 drives an LED 26 labeled "IGNITION QUIT". Finally, an injection quit flip-flop and LED driver 28 drives an LED 30 labeled "INJECTION QUIT".

The pulse stream analyzer 10, as illustrated in FIG. 1 in block diagram form, is attached to the vehicle's 12 Volt battery 32 in order to pick off the alternator ripple signal. The electronics of the analyzer 10 are powered through a 6V regulator 34, also connected to the positive 12V lead 32. The alternator ripple signal is fed, through diode protection, to a specially biased dual gain amplifier 36 and Schmitt trigger 38 to provide a digital pulse stream representing the ripple signal. This digital pulse stream, in turn, is fed through a 200 msec delay and alternator LED driver 40, which drives an LED 42 on the keypad 14, and is also fed through an inverter 44 to produce a DC level representing whether the engine is tuning (a high DC level) or not (a low DC level).

The ignition signal is picked up by a large alligator clip 46, capacitively through the insulation, when clamped over a spark plug lead, or preferably a coil output lead, and is fed to a 20 Amp bidirectional Transient Voltage Suppressor (TVS) protector 48, in case high voltage arcs to the clip 46. The signal then goes through a high input impedance Schmitt trigger 50 to a 200 ms delay with "IGN" LED driver 52, for driving an "IGN" LED 54 on the keypad 14 (FIG. 3), which produces a low DC level when the pulse stream is operating and a high DC level when it is not. The pulses are also fed through a long (2 sec) delay 56 to enable an ignition gate 58 when there are pulses.

The injection pulses are picked up, magnetically, by a coil 60 placed next to, and in line with, an injector, and are fed to a high gain amplifier 62 biased into a Schmitt trigger 64 to provide digital pulses. These digital pulses feed a 200 ms delay and "INJ" LED driver 66, which drives an "INJ" LED 68 on the keypad 14, and also feed a long delay (2 secs) pulse enable circuit 70, with the main signal being low for injector pulses and high for none.

The digital ignition signal is fed into the 4-input ignition AND gate 58 and the digital injection signal is fed into a 4-input injector AND gate 72, as shown in FIG. 1. Additionally, the alternator ripple signal is fed into each of the gates 58 and 72. Subsequently, as the test is performed, whichever signal stops first, while the engine is running (as indicated by the ALT LED 42), a high output will be produced at the respective gate 58, 72, causing the other gate to be latched off by a latching circuit 74. The result is that whichever pulse stream quits first will continue through the circuit, and the other will be locked out. When the signal finishes, and the IGNITION QUIT LED 26, the INJECTION QUIT LED 30, or the FUEL QUIT LED 22 is set, then both gates are locked off and the result is held until a RESET button 76 on the keypad 14 is depressed, activating an associated RESET circuit 77 allowing new tests to be run.

Because it is desired that the instrument 10 be functional to analyze many different types of vehicles, a unique delay time is set up for each vehicle, ultimately to provide a practical "FUEL QUIT" time window, during which the IGNITION QUIT driver 24 and INJECTION QUIT driver 28 are locked off. If the cause of an engine quitting is lack of fuel, perhaps because of a bad fuel pump, then both ignition and injection pulse streams will continue until the engine stops. This unique time window will help to identify this situation.

When the RESET button 76 and an adjacent SETUP button 78 are depressed together, the SETUP LED 18 lights, and this unique time window is ready to be set up by turning off the engine with the ignition switch (not shown). When the first pulse gets through the gate 58 or 72, subsequent to engine shut-off, it starts a digital memory timer 80, which operates in two modes, set-up and ready. The digital memory timer 80 records the time taken for the engine to stop in its memory, while in set-up mode, which is then changed to ready mode at the end of the gate signal by automatically turning off set-up. This decreases the clock time on a dual frequency clock 82 by 25%, so that the timer counts this time 25% quicker, while in ready mode, thereby guaranteeing that, if the ignition is switched off, IGNITION QUIT or INJECTION QUIT will be the result. This means now that the FUEL QUIT window is 75% of the normal shut down time at idle and if the gate signal stops within this window, then the FUEL QUIT LED 22 will stay lit and will lock off the input gates 58, 72 through latch 74, maintaining "memory" for the result. If the signals, on the other hand, continue through this time window, then the IGNITION QUIT LED 26 or the INJECTION QUIT LED 30 will light. Since a reliable ALT signal 42 is necessary for accurate results, interference from electrical accessories, such as fans or the like, while the ignition is on and the engine is stopped, must be eliminated. To achieve this, both the RESET button 76 and a CUT button 84 on the keypad 14 are depressed simultaneously, thus activating a CUT flip-flop and CUT LED driver, which in turn illuminates a CUT LED 86 on the keypad 14. The CUT flip-flop cuts the gain of the ripple amplifier 36 in half, eliminating the interference while still acquiring the ripple signal.

Figure 2:
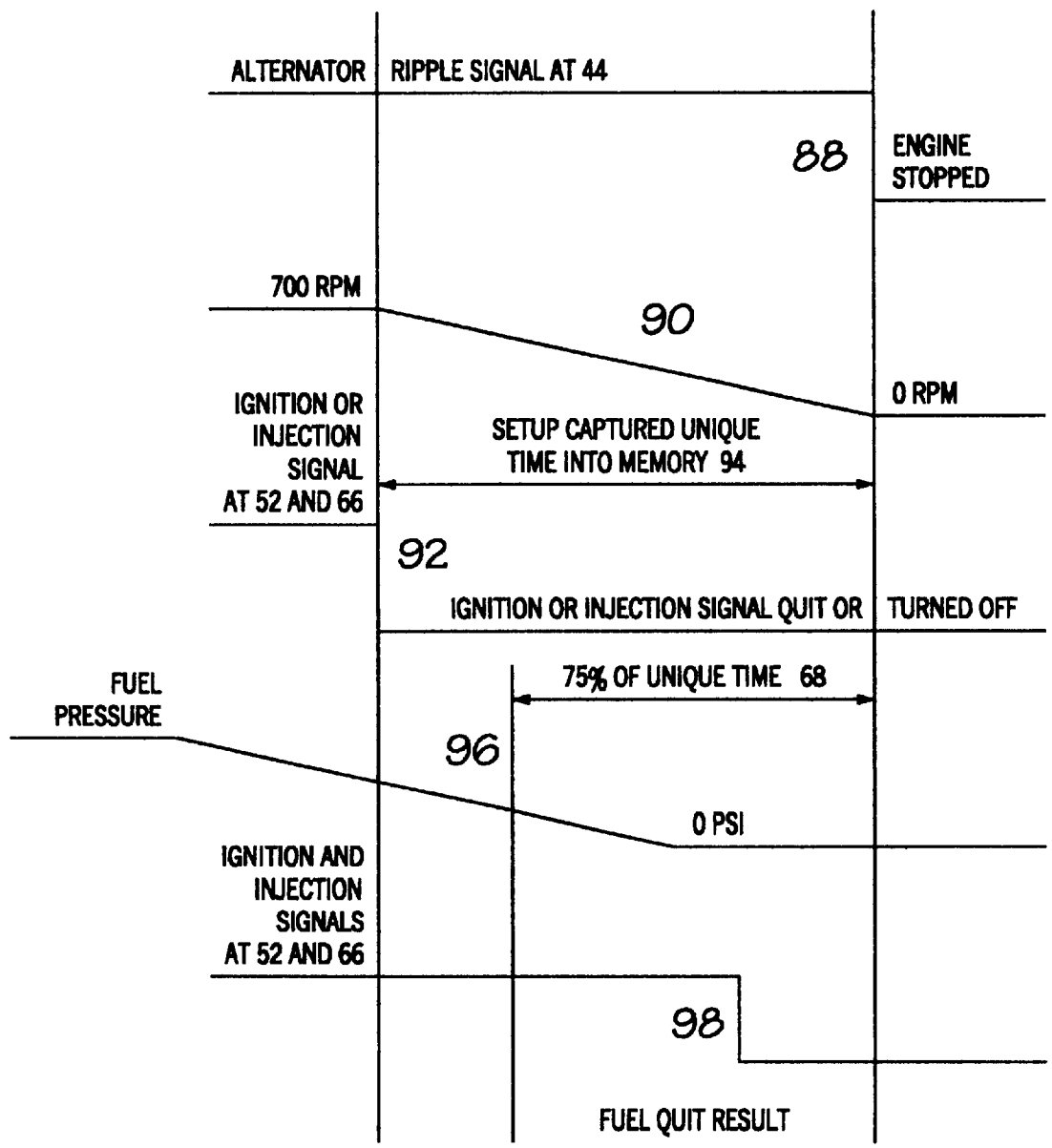
FIG. 2 is a timing diagram illustrating an exemplary analysis leading to a "Fuel Quit" result.

FIG. 2 is a timing diagram for the alternator ripple 88, the RPM 90, the ignition or injection signal if they cause the engine to stop or setup is set (92), the setup time captured (94), or if lack of fuel (96) causes the engine to quit, then the ignition and injection signals (98) stop within the 75% fuel quit time window (100).

Now, a preferred method for operating the inventive analyzing device will be more particularly described. As noted supra, the primary purpose of the instrument 10 is to analyze the last quarter second or so of an engine's operating cycle, and indicate which area to check: fuel, ignition, or injection. Initially, to operate the instrument 10, the leads (not shown) are connected to the vehicle's battery. The alligator clip 46 is attached over the spark plug wire, or ideally to the coil wire, over the insulation and past the teeth, as a capacitive pickup only. Then, the magnetic injection pickup 60 is placed next to the port injector, in line with it and as close as possible. Port injectors are chosen that are the farthest from the ignition wires, and on sequential injection the same cylinder is used as the spark plug wire for accurate pickup and analysis.

At this juncture, the vehicle ignition is turned on, without starting the engine. The ALT LED 42 is viewed to see if it is on, or if it is flashing, which would indicated that it is being interfered with because of operating fan motors or other accessories. A fan may be placed in front of the radiator, to cause the automatically operated vehicle cooling fan to stop operation, and interior blowers can be turned off, to attempt to eliminate this interference. If these measures are not successful, then the RESET button 76 and CUT button 84 may be depressed simultaneously to cut the amplifier gain. The ALT LED 42 can then be checked to ensure that it remains off.

Once it is ensured that there is no electrical interference which may affect the accuracy of the test performed by the analyzer 10, the engine is started, after which each of the ALT LED 42, IGN LED 54, AND INJ LED 68 should be continuously lit. If the injection pickup is not used, as on carbureted vehicles, it should be ascertained that the INJ LED 68 is not on or flashing. If the SETUP IGNITION LED 18 is not on, the RESET button 76 and SETUP button 78 are depressed simultaneously to set up the individual ignition turn-off time for the particular vehicle being tested.

At this point, the ignition switch is turned off, and the time constant is set. Now, the engine is started, the RESET button 76 is depressed, and the analyzer 10 is ready to perform its tests.

If the engine quits because of a computer or injector wiring fault, the INJECTION QUIT LED 30 will light. If the engine quits because of the ignition coil, wiring or module, the IGNITION QUIT LED 26 will light. If the ignition and injection pulses both continue until the engine quits, then the FUEL QUIT LED 22 will light. This can be verified by disconnecting injector power, coil primary, and fuel pump fuse, etc. individually.

When any of the FUEL QUIT LED 22, IGNITION QUIT LED 26, or INJECTION QUIT LED 30 are on, these results are "held" and no analysis is possible until the RESET button 76 is depressed. Thus, all results should be ignored until setup is completed and RESET is depressed.

For best accuracy, the test should be repeated three or four times, if possible, and results compared. If variation is found between ignition and injection results, the problem could be in common wiring or components such as the ignition switch, ignition module or pickup, or crank sensor. Occasionally, the setup procedure should be redone, while waiting for the engine to quit, to update the setup time for changes in the idle speed, warm up, etc.

The inventive instrument 10 is primarily designed to diagnose engines at idle, but may be useful on test drives to identify what causes stalling. Because engine compartment heat will melt the instrument, it is desirable to locate the instrument outside, next to the windshield, with the leads clamped carefully by the hood.

To diagnose why an engine will not start, the IGN LED 26 and INJ LED 30 are monitored while turning over the engine. If both pulse, then the problem is probably a lack of fuel or timing.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention. It is intended that the scope of the invention be limited not by this detailed description, but rather only by the claims appended hereto.

What is claimed is:

1. A pulse stream analyzer for use in diagnosing the cause of vehicle engine failure, said pulse stream analyzer comprising:
   a first circuit portion for processing a ripple signal from an alternator of said vehicle to provide a digital pulse stream representing said ripple signal, which provides an indication as to whether said engine is operating;
   a second circuit portion having a capacitive ignition pickup for providing an ignition digital pulse stream;
   a third circuit portion having a magnetic injector pickup for providing an injector digital pulse stream;
   a first AND gate for receiving a logic signal derived from said ignition digital pulse stream;
   a second AND gate for receiving a logic signal derived from said injector digital pulse stream; and
   a latching element.

2. The pulse stream analyzer as recited in claim 1, and further comprising a housing having a keypad, said keypad having a plurality of keys and indicator lights disposed thereon.

3. The pulse stream analyzer as recited in claim 1, and further comprising means for applying an equal delay to each said digital pulse stream to produce said logic signals.

4. The pulse stream analyzer as recited in claim 3, and further comprising a driver which enables a "FUEL QUIT" indicator if the digital pulse stream representing said alternator ripple signal stops before the ignition or injector digital pulse streams stop.

5. The pulse stream analyzer as recited in claim 1, wherein each of said first and second AND gates comprise four input gates.

6. The pulse stream analyzer as recited in claim 1, wherein the pulse stream analyzer is designed such that whichever of said digital ignition and digital injection pulse streams stops first, while said vehicle engine is operating, a high output is produced at its corresponding gate, causing the other gate to be locked out by said latching element, which in turn activates an indicator related to the digital pulse stream which stopped first.

7. The pulse stream analyzer as recited in claim 6, and further comprising a housing having a keypad, said keypad having a plurality of keys and indicator lights disposed thereon, wherein said indicator comprises one of said keyboard indicator lights.

8. A method for diagnosing the cause of a vehicle engine failure, said method comprising:
 connecting a digital pulse stream analyzer to an alternator of a vehicle engine to be tested;
 connecting a capacitive ignition pickup of said digital pulse stream analyzer to a spark plug or coil wire of said engine;
 placing a magnetic pickup in close proximity with an injector body or throttle body of a fuel injector of said engine;
 turning an ignition switch of the vehicle on without starting said vehicle engine and checking to ensure that there is no electrical interference with said analyzer;
 starting said vehicle engine and initiating a setup sequence setting a unique delay time interval for the vehicle;
 turning said vehicle engine off, to set said unique delay time interval;
 starting said vehicle engine again;
 activating a reset circuit; and
 evaluating a test result indication on a keyboard of said analyzer.

\* \* \* \* \*